United States Patent
Lee et al.

(10) Patent No.: US 9,059,823 B2
(45) Date of Patent: Jun. 16, 2015

(54) APPARATUS AND METHOD FOR PERFORMING INTER-CELL INTERFERENCE COORDINATION USING LIMITED CHANNEL STATE INFORMATION IN HETEROGENEOUS NETWORK

(71) Applicants: Jae Hong Lee, Seoul (KR); Jin Hyun Park, Seoul (KR)

(72) Inventors: Jae Hong Lee, Seoul (KR); Jin Hyun Park, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 38 days.

(21) Appl. No.: 13/937,008

(22) Filed: Jul. 8, 2013

(65) Prior Publication Data
US 2014/0213271 A1 Jul. 31, 2014

(30) Foreign Application Priority Data
Jan. 28, 2013 (KR) ........................ 10-2013-0009514

(51) Int. Cl.
*H04W 24/10* (2009.01)
*H04L 5/00* (2006.01)

(52) U.S. Cl.
CPC .................................... *H04L 5/0032* (2013.01)

(58) Field of Classification Search
CPC ... H04L 1/0026; H04L 5/0053; H04L 1/0003; H04W 72/082; H04W 24/10; H04W 72/1231; H04W 72/1289; H04W 16/10; H04W 72/042; H04W 72/0426; H04W 84/045
USPC ...................................................... 455/452.1
See application file for complete search history.

(56) References Cited

U.S. PATENT DOCUMENTS

| | | | |
|---|---|---|---|
| 2012/0021753 A1* | 1/2012 | Damnjanovic et al. | ........ 455/450 |
| 2012/0201152 A1* | 8/2012 | Yoo et al. | ........ 370/252 |
| 2014/0286189 A1* | 9/2014 | Kang et al. | ........ 370/252 |
| 2014/0286291 A1* | 9/2014 | Einhaus et al. | ........ 370/329 |

FOREIGN PATENT DOCUMENTS

| | | |
|---|---|---|
| KR | 10-2012-0007997 | 1/2012 |
| KR | 10-2012-0123718 | 11/2012 |
| WO | WO 2009-065075 | 5/2009 |

OTHER PUBLICATIONS

D. Lopez-Perez et al, "On the Expanded Region of Picocells in Heterogeneous Networks," IEEE Journal of Selected Topics in Signal Processing, 2012, pp. 281-294.
Guvenc, "Capacity and Fairness Analysis of Heterogeneous Networks with Range Expansion and Interference Coordination," Communications Letters, IEEE, 2011, pp. 1084-1087.

* cited by examiner

Primary Examiner — Diane Mizrahi
(74) Attorney, Agent, or Firm — Wells St. John P.S.

(57) ABSTRACT

Disclosed herein are an apparatus and method of performing inter-cell interference coordination in a heterogeneous network. The apparatus includes a reception unit, a determination unit, a generation unit, and a transmission unit. The reception unit receives a modulation and coding scheme (MCS) level from a small cell base station in each frame. The determination unit determines a calculated MCS level based on the MCS level and an interfering signal estimated through probabilistic modeling. The generation unit generates a ratio of subframes, in which data will not be transmitted, to all subframes of a frame based on the MCS level and the calculated MCS level. The transmission unit transmits the ratio and the calculated MCS level to the small cell base station.

20 Claims, 6 Drawing Sheets

APPARATUS AND METHOD FOR PERFORMING INTER-CELL INTERFERENCE COORDINATION USING LIMITED CHANNEL STATE INFORMATION IN HETEROGENEOUS NETWORK

CROSS REFERENCE TO RELATED APPLICATION

This application claims the benefit of Korean Patent Application No. 10-2013-0009514, filed on Jan. 28, 2013, which is hereby incorporated by reference in its entirety into this application.

BACKGROUND OF THE INVENTION

1. Technical Field

The present invention relates generally to a heterogeneous network in which a plurality of small cells is present in a large cell and, more particularly, to an apparatus and method for performing inter-cell interference coordination using limited channel state information in a heterogeneous network, which are capable of performing interference coordination using statistical information about a channel between each base station and each terminal in order to improve the throughput of a heterogeneous network in which a large cell and one or more small cells are present together in a mobile communication environment.

2. Description of the Related Art

A heterogeneous network model in which one or more small cells, such as a picocell, are located in a macrocell, that is, an existing large-sized base station, is attracting attention as a method of increasing throughput in a mobile communication environment. A heterogeneous network model is being considered for key technology for the next generation mobile communication standard, such as LTE-Advanced.

In a heterogeneous network, a Range Expansion (RE) technique for increasing coverage while maintaining the transmission power of a small cell base station without change is used to reduce the load of a large cell and to increase the utilization of a small cell. In this case, in a small cell terminal located in extended coverage, the intensity of interference transmitted from a large cell base station is higher than the intensity of a signal transmitted from the small cell base station, and thus serious deterioration of performance occurs.

Accordingly, in order to overcome the above problem, Inter-Cell Interference Coordination (ICIC) techniques have been proposed. These techniques mainly prevent a large cell base station from transmitting signals during a predetermined period of time, or utilize a transmission power control technique. The inter-cell interference coordination techniques that are disclosed in Korean Patent Application Publication No. 2012-0123718, etc. assume that information about channels between all terminals and a base station is completely known, or do not utilize channel state information. The former case is problematic in that the assumption about the channel state information is not consistent with an actual situation, and the latter case is problematic in that it is impossible to perform adaptive resource assignment based on channel states.

Accordingly, in light of the disadvantages of the conventional technologies, there is a need for new technology that performs interference coordination based on limited information about the states of channels between a large cell base station and small cell terminals. For this purpose, the probabilistic modeling of channels between a large cell base station and small cell terminals and a new interference coordination apparatus and method using a corresponding model need to be proposed.

SUMMARY OF THE INVENTION

Accordingly, the present invention has been made keeping in mind the above problems occurring in the conventional art, and an object of the present invention is to provide an apparatus and method for performing inter-cell interference coordination using limited channel state information in a heterogeneous network, which are capable of reducing the deterioration of performance attributable to interference when limited channel state information in a heterogeneous network is given.

Another object of the present invention is to provide a apparatus and method for performing inter-cell interference coordination using limited channel state information in a heterogeneous network, which are capable of controlling interference that is exerted on a small cell terminal by a large cell base station using a channel model applied between the terminal and the base station, large-scale fading gain achieved between the terminal and the base station, and feedback information adapted to be periodically transmitted by the terminal.

In accordance with an aspect of the present invention, there is provided a method of performing inter-cell interference coordination in a heterogeneous network, including receiving a modulation and coding scheme (MCS) level from a small cell base station in each frame; determining a calculated MCS level based on the MCS level and an interfering signal estimated through probabilistic modeling; generating a ratio of subframes, in which data will not be transmitted, to all subframes of a frame based on the MCS level and the calculated MCS level; and transmitting the ratio and the calculated MCS level to the small cell base station.

The small cell base station may be configured such that each terminal connected to the small cell base station feeds back an MCS level to the small cell base station in each frame.

The MCS level may be a maximum MCS level that satisfies a block error rate (BLER) limitation requirement.

The small cell base station may arrange the MCS levels, and schedule terminals that feedback lower MCS levels of the arranged MCS levels, corresponding to the ratio, in interference guard subframes.

The scheduling may be performed on a 1 ms subframe basis.

The terminals scheduled in the interference guard subframes may have the calculated MCS level.

The interfering signal may include an interfering signal from an adjacent small cell.

The ratio may be generated as an optimum ratio that maximizes sum network throughput.

The ratio may be generated as the optimum ratio based on the sum of the MCS level of each terminal connected to a small cell, the calculated MCS level, and the MCS level of each terminal connected to a large cell when subframes corresponding to the ratio are not used.

The ratio being generated as the optimum ratio may be terminated when the optimum ratio reaches 1 while the ratio is being increased.

The small cell may be configured such that range expansion (RE) has been applied to the small cell.

The small cell may be a picocell or a femtocell.

Receiving and transmitting may be performed via an X2 interface.

Each cell in the heterogeneous network may transmit information on a 10 ms frame basis in accordance with a Long Term Evolution (LTE) standard.

In accordance with another aspect of the present invention, there is provided an apparatus for performing inter-cell interference coordination in a heterogeneous network, including a reception unit configured to receive an MCS level from a small cell base station in each frame; a determination unit configured to determine a calculated MCS level based on the MCS level and an interfering signal estimated through probabilistic modeling; a generation unit configured to generate a ratio of subframes, in which data will not be transmitted, to all subframes of a frame based on the MCS level and the calculated MCS level; and a transmission unit configured to transmit the ratio and the calculated MCS level to the small cell base station.

The small cell base station may be configured such that each terminal connected to the small cell base station feeds back an MCS level to the small cell base station in each frame; and the MCS level may be a maximum MCS level that satisfies a BLER limitation requirement.

The small cell base station may arrange the MCS levels, and schedule terminals that feed back lower MCS levels of the arranged MCS levels, corresponding to the ratio, in interference guard subframes.

The interfering signal may include an interfering signal from an adjacent small cell.

The ratio may be generated as an optimum ratio that maximizes sum network throughput.

The small cell may be configured such that RE has been applied to the small cell.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
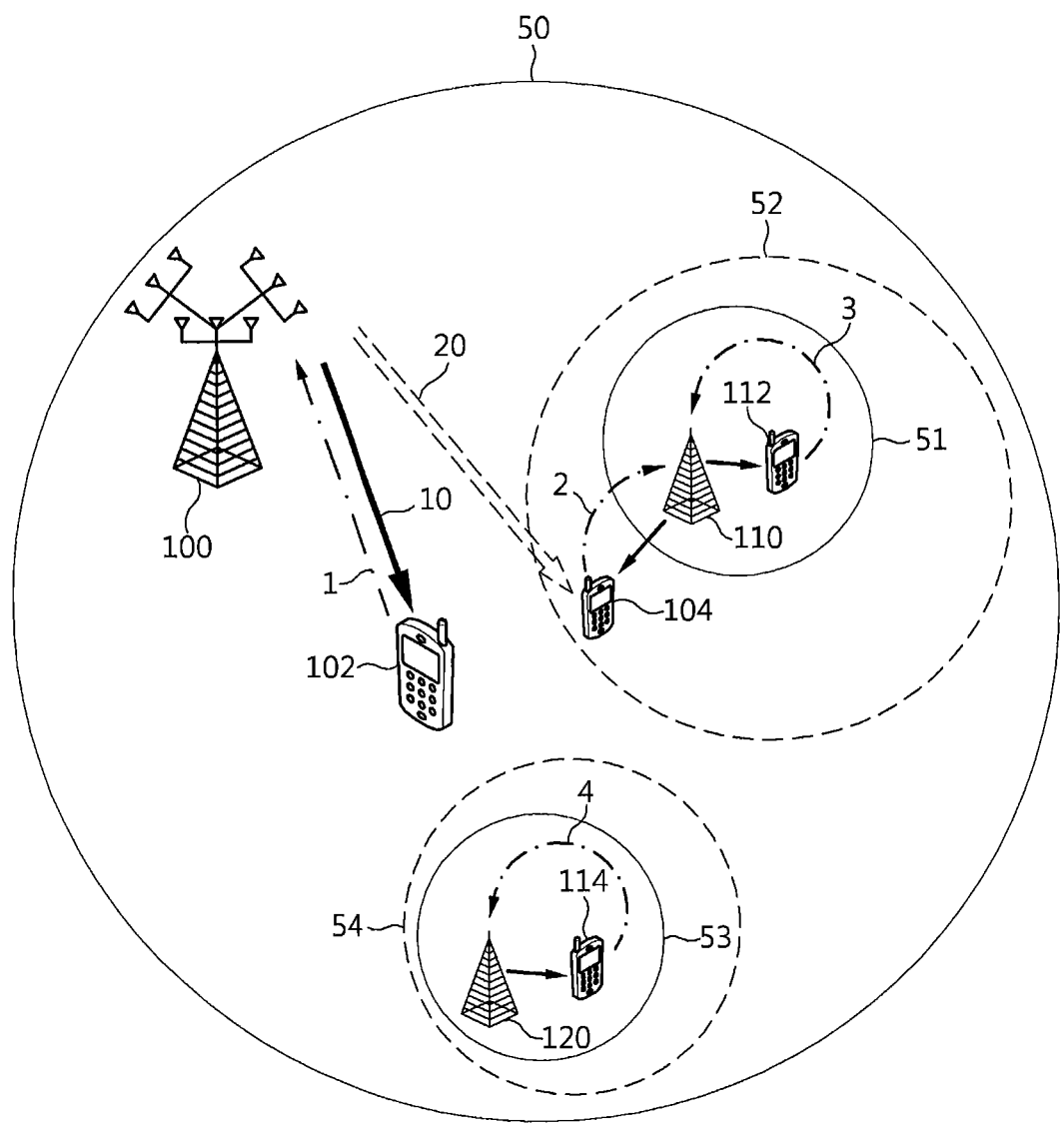
FIG. 1 illustrates the structure of a heterogeneous network and an interference scenario therein according to the present invention.

The present invention will be described in detail below with reference to the accompanying drawings. Repeated descriptions and descriptions of known functions and configurations which have been deemed to make the gist of the present invention unnecessarily vague will be omitted below.

The embodiments of the present invention are intended to fully describe the present invention to a person having ordinary knowledge in the art. Accordingly, the shapes, sizes, etc. of elements in the drawings may be exaggerated to make the description clear.

In the present invention, a down link heterogeneous network in which there are a single macrocell and M picocells inside the macrocell is considered. It will be apparent that a small cell described in connection with the present invention may include not only a picocell but also a femtocell. Accordingly, in the following description, a picocell base station may be replaced with a femtocell base station, a picocell may be replaced with a femtocell, and a pico-terminal may be replaced with a femto terminal. A macrocell base station is located at the center of the macrocell, and terminals are distributed inside the macrocell based on a Poisson point process having density a. Picocell base stations are located in the M areas where terminals are very densely distributed.

Meanwhile, it is assumed that a total of U terminals are present in the network. For ease of detonation, indices from 1 to U are assigned to the terminals, index 0 is assigned to the macrocell base station, and indices from 1 to M are assigned to the picocell base stations. It is assumed that the transmission power of a base station m is $P_m$ ($0 \leq m \leq M$), the large-scale fading gain between a terminal u and the base station m is $X_{u,m}$ ($0 \leq u \leq U$, $0 \leq m \leq M$), and the small-scale fading gain is $H_{u,m}$ ($0 \leq u \leq U$, $0 \leq m \leq M$). Then the signal to interference plus noise ratio (SINR) in the terminal u with respect to a transmission signal from the base station m may be expressed by the following Equation 1:

$$\gamma_{u,m} = \frac{P_m X_{u,m} H_{u,m}}{\sum_{k=0, k \neq m}^{M} P_k X_{u,k} H_{u,k} + N_0} \quad (1)$$

In Equation 1, the numerator thereof represents a transmission signal that is sent by the picocell base station m, $$\sum_{k=1, k \neq}^{M} P_k X_{u,k} H_{u,k}$$

of the denominator represents an interfering signal that is sent by one or more picocell base stations, other than the picocell base station m, and the macrocell base station, and $N_0$ represents the variance of additive white Gaussian noise (AWGN). It is assumed that the large-scale fading gain $X_{u,m}$ between all the terminals and all the base stations are known, and the accurate value of the small-scale fading gain $H_{u,m}$ is unknown and only the statistical characteristics thereof are known.

The structure of a heterogeneous network and the aspects of the occurrence of interference according to the present invention will be described below.

FIG. 1 illustrates the structure of a heterogeneous network and an interference scenario therein according to the present invention.

Referring to FIG. 1, in the heterogeneous network, there are a macro-terminal 102, an interference pico-terminal 104 and pico-terminals 112 and 114, and a macrocell base station 100 and a picocell base station 110. The terminals are connected to a base station that transmits the strongest signals.

Meanwhile, in the heterogeneous network, in order to reduce the load of the macrocell 50 and increase the utilization of the small cells 51 and 53, a range expansion (RE)

technique that increases coverage while maintaining the transmission power of a small cell base station without change is employed. In the heterogeneous network to which the RE technique has been applied, each of the terminals is connected to a base station that satisfies the following Equation 2:

$$m^* = \arg\max_{m=0,1,\ldots,M}(\gamma_{u,m} + \lambda_m) \quad (2)$$

Equation 2 is used to obtain the index of the base station to which the terminal is coupled. In Equation 2, m* is the index of the base station to which the terminal is connected, and $\gamma_{u,m}$ is the SINR. Furthermore, $\lambda_m$ is the RE bias. $\lambda_0=0$ is used for a macrocell, and a value that is predetermined during system configuration is used for a picocell.

Continuing with FIG. 1, it is assumed that in the heterogeneous network in which a cell served by at least one picocell base station 110 or 120 (hereinafter referred to as the "picocell") is present in a cell served by the macrocell base station 100 (hereinafter referred to as the "macrocell"), the macro-terminal 102 is provided with service via the macrocell base station 100 (see reference numeral 10), and the pico-terminals 112 and 114 are provided with service via the picocell base station 110. Although in FIG. 1, the two picocell base stations 110 and 120, the single macro-terminal 102, the two pico-terminals 112 and 114 and the single interference pico-terminal 104 are illustrated for ease of description, it will be apparent in practice that more picocell base stations may be present, more pico-terminals may be provided with service via the corresponding picocell base station, and more macro-terminals may be provided with service via the macrocell base station.

The interference pico-terminal 104 located in the extended coverage 52 experiences serious deterioration of performance because the intensity of an interfering signal 20 transmitted from the macrocell base station 100 is higher than the intensity of a signal transmitted from the picocell base station 110. That is, the interference pico-terminal 104 is not connected to the picocell base station 110 before the RE is performed (see reference numeral 51), but is connected to the picocell base station 110 after the RE has been performed (see reference numeral 52). Accordingly, the interfering signal 20 transmitted from the macrocell base station 100 brings about a problem.

Continuing with FIG. 1, all the terminals feed back modulation and coding scheme (MCS) levels to the base station to which they are connected (see reference numerals 1, 2, 3, and 4). The MCS levels will be described later with reference to FIG. 2.

The operation of a large cell base station that is performed to achieve interference coordination in a heterogeneous network according to the present invention will be described below.

Figure 2:
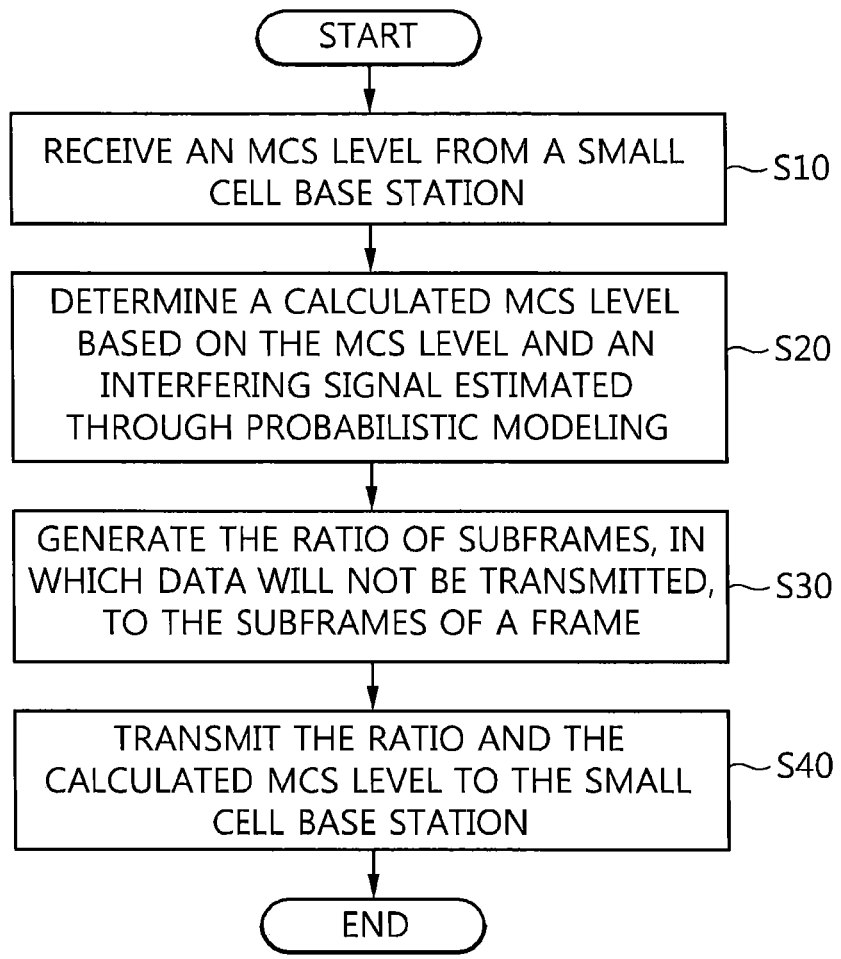
FIG. 2 is a flowchart illustrating the operation of a large cell base station that is performed to achieve interference coordination in a heterogeneous network according to the present invention.

FIG. 2 is a flowchart illustrating the operation of a large cell base station that is performed to achieve interference coordination in a heterogeneous network according to the present invention.

Referring to FIG. 2, the operation of a large cell base station includes step S10 of receiving an MCS level from a small cell base station, step S20 of determining a calculated MCS level based on the MCS level and an interfering signal estimated through probabilistic modeling, and step S30 of generating the ratio of subframes, in which data will not be transmitted, to the subframes of a frame, and step S40 of transmitting the ratio and the calculated MCS level to the small cell base station.

At step S10 of receiving the MCS level from the small cell base station, the macrocell base station, that is, a large cell base station, receives the MCS level from the small cell base station via an X2 interface that is typically wired. However, the reception path is not limited to the X2 interface. In the case of the small cell base station, each terminal connected to the small cell feeds back an MCS level to the small cell base station in each frame. Each base station transmits information on a 10 ms frame basis pursuant to the LTE standard. In each frame, a terminal u measures the SINR, and feeds back information about a maximum modulation and coding scheme (MCS) level satisfying a given Block Error Rate (BLER) limitation requirement to a base station. The MCS level information is used to determine an encoding scheme and error correction code that are used to transmit data from a base station to a terminal. In the LTE communication standard, there are 15 MCS levels, and thus this information is transmitted as 4 bits. The MCS level is determined based on the reception SINR according to the following Equation 3:

$$C_u = f(\gamma_{u,m^*}), 1 \leq u \leq U \quad (3)$$

Equation 3 is a relation between the MCS level and the SINR. In Equation 3, f is a quantization function that causes the SINR to correspond to the MCS level.

At step S20 of determining the calculated MCS level, the interfering signal is estimated through probabilistic modeling. While a conventional system determines only the MCS level of a signal to be transmitted to a terminal based on MCS level feedback information received by the terminal, the present invention may determine a calculated MCS level based on the MCS level feedback information and an interfering signal, the interference signal being estimated through probabilistic modeling.

That is, since the LTE-A standard currently under consideration does not provide a method of determining the intensity of an interfering signal between a base station and a terminal in a home, the present invention estimates the intensity of an interfering signal between the base station and the terminal in a probabilistic manner. In this case, the interfering signal estimated in a probabilistic manner includes not only an interfering signal from a macrocell but also an interfering signal from a picocell. The calculated MCS level is the MCS level of a terminal that has been scheduled in an interference guard subframe, which will be described later.

If the terminal u connected to the picocell base station m* has been scheduled in an interference guard subframe, the SINR may be obtained using the following Equation 4:

$$\tilde{\gamma}_{u,m^*} = \frac{P_{m^*} X_{u,m^*} H_{u,m^*}}{\sum_{k=1,k\neq m}^{M} P_k X_{u,k} H_{u,k} + N_0} \quad (4)$$

Equation 4 takes a form in which an interfering signal $P_0 X_{u,0} H_{u,0}$ from a macrocell has been eliminated from the denominator of Equation 1, and the starting point of k is different from that of Equation 1 in the summation of the denominator.

The MCS level that is used when the picocell base station transmits a signal to the terminal u via an interference guard subframe satisfies the following Equation 5:

$$Pr[\tilde{\gamma}_{u,m}^* < f^{-1}(\tilde{C}_u)] \leq P_e \quad (5)$$

$f^{-1}(\tilde{C}_u)$ is the minimum SINR that is required to successfully receive a signal transmitted at the MCS level $\tilde{C}_u$. Equation 5 represents the requirement in which the probability of the actual SINR being lower than the minimum SINR that is required to receive a signal should be equal to or lower than $P_e$. $P_e$ is a BLER limitation requirement.

If it is assumed that an interfering signal $Y_{u,k}=P_k X_{u,k} H_{u,k}$ applied by the picocell base station k to the terminal u is an exponential random variable having an average of $1/\alpha_{u,k}$, the interfering signals from all picocell base stations may be expressed by the following Equation 6:

$$I_u = \sum_{k=1, k \neq m^*}^{M} Y_{u,k} \qquad (6)$$

Equation 6 represents the summation term of the denominator of Equation 4, that is, the interfering signal from the picocell, using $I_u$. Equation 6 is the sum of exponential random variables having different averages, which is known to be a hypo-exponential distribution. Accordingly, the probability distribution for the interfering signals of the picocell base station is a hypo-exponential distribution, as illustrated in the following Equation 7:

$$f_{I_u}(x) = \sum_{i \neq m^*}^{M} \alpha_{u,0} e^{-\alpha_{u,0} x} \left( \prod_{j \neq i, j \neq m^*} \frac{\alpha_{u,j}}{\alpha_{u,j} - \alpha_{u,i}} \right) \qquad (7)$$

Equation 7 represents the probability density function of $I_u$. Since Equation 6 can determine the statistical characteristics of $Y_{u,k}$, the probability density function of $I_u$, that is, the sum of random variables, is obtained as described above. The above equation is already known in the theory of probability, and thus an additional description thereof will be omitted.

The left-hand side of Equation 5 may be expressed based on Equation 4 and the definition of the interfering signal $Y_{u,k}$ by the following Equation 8:

$$Pr[\tilde{\gamma}_{u,m^*} < f^{-1}(\tilde{C}_u)] = Pr\left[\frac{Y_{u,m^*}}{I_u + N_0} < f^{-1}(\tilde{C}_u)\right] \qquad (8)$$

If it is assumed that an interfering signal $Z_u=P_0 X_{u,0} H_{u,0}$ from an macrocell is an exponential distribution having an average of $1/\zeta_u$, Equation 1 may be approximated by Equation 9 according to the relation of Equation 3:

$$\tilde{\gamma}_{u,m^*} = \frac{Y_{u,m^*}}{I_u + Z_u + N_o} \approx f^{-1}(C_u) \qquad (9)$$

In Equation 9, $f^{-1}(C_u)$ is the reception SINR that can be determined based on MCS level feedback that is received by the picocell base station. Since the MCS level feedback $C_u$ is a value that is obtained by quantizing the reception SINR, only the approximate value of the reception SINR can be determined.

The left-hand side of Equation 5 may be expressed in terms of the probability for the interfering signal from the macrocell from via Equations 8 and 9, as shown in the following Equation 10:

$$Pr[\tilde{\gamma}_{u,m^*} < f^{-1}(\tilde{C}_u)] = Pr\left[Z_u \leq \frac{f^{-1}(\tilde{C}_u) - f^{-1}(C_u)}{f^{-1}(C_u)} (I_u + N_0)\right] \qquad (10)$$

A closed for expression is derived from Equation 10 through the process of the following Equation 11:

$$Pr\left[Z_u \leq \frac{f^{-1}(\tilde{C}_u) - f^{-1}(C_u)}{f^{-1}(C_u)}(I_u + N_0)\right] = E\left[Pr\left[Z_u \leq \frac{f^{-1}(\tilde{C}_u) - f^{-1}(C_u)}{f^{-1}(C_u)}(x + N_0) \middle| I_u = x\right]\right] \qquad (11)$$

$$= \int_0^\infty \int_0^{\frac{\{f^{-1}(\tilde{C}_u)-f^{-1}(C_u)\}\{x+N_0\}}{f^{-1}(C_u)}} f_{Z_{u,m}}(z) f_{I_u}(x) dz dx$$

$$= \sum_{i \neq m, i \neq 0} \alpha_{u,i} \left( \prod_{k \neq i, k \neq m} \frac{\alpha_{u,k}}{\alpha_{u,k} - \alpha_{u,i}} \right) \times$$

$$\left[ \frac{1}{\alpha_{u,i}} \frac{f^{-1}(C_u)}{f^{-1}(\tilde{C}_u) - (1-\alpha_{u,i}) f^{-1}(C_u)} \exp\left( \frac{f^{-1}(\tilde{C}_u) - f^1(C_u)}{f^{-1}(C_u)} \zeta_u N_0 \right) \right]$$

Since the random variable $I_u$ is included in the left-hand side of Equation 11, $I_u$ should be averaged, as shown in the first right-hand side of Equation 11. The outside integration $\int_0^\infty f_{I_u}(x) dx$ of the second right-hand side of Equation 11 represents the process of obtaining the average of $I_u$. The integration is $$\int_0^{\frac{\{f^{-1}(\tilde{C}_u)-f^{-1}(C_u)\}\{x+N_0\}}{f^{-1}(C_u)}} f_{Z_{u,m}}(z) dz =$$

$$Pr\left[Z_u \leq \frac{f^{-1}(\tilde{C}_u) - f^{-1}(C_u)}{f^{-1}(C_u)}(x + N_0) \middle| I_u = x\right].$$

The macrocell base station determines the calculated MCS level $\tilde{C}_u$ that causes the right-hand side of Equation 11 to be equal to or smaller that the BLER limitation requirement for every terminal connected to the small cell based on the MCS level received from the small cell base station and estimation through probabilistic modeling.

Figure 4:
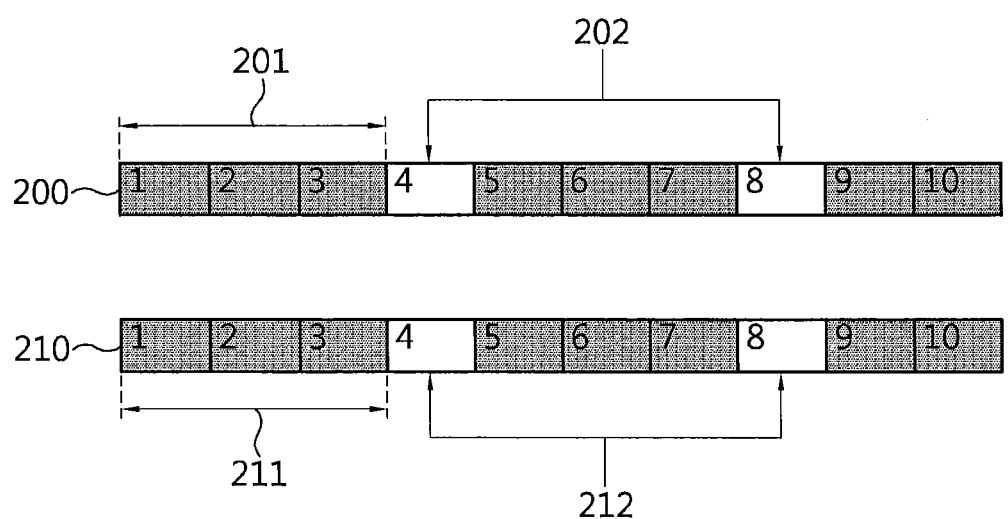
FIG. 4 illustrates an example of the assignment of subframes in a small cell base station according to the present invention.

At step S30 of generating the ratio of subframes, in which data will not be transmitted, to the subframes of the frame, the ratio is the ratio of subframes, in which data will not be transmitted, to the 10 subframes of a frame that is transmitted in a macrocell, that is, a large cell. Referring to FIG. 4, for example, if the ratio is 0.2, only 8 subframes of a macrocell frame 200 become scheduled subframes 201 and the remaining two subframes become empty subframes 202, and thus data is not transmitted during the empty subframes 202. The ratio is generated as an optimum ratio that maximizes the sum network throughput. The optimum ratio is based on the sum of the MCS level of each terminal connected to the small cell, the calculated MCS level, and the MCS level of each terminal connected to the large cell when subframes corresponding to the former ratio are not used. A detailed algorithm that generates the optimum ratio will be described later in conjunction with FIG. 5.

At step S40 of transmitting the ratio and the calculated MCS level to the small cell base station, the ratio and the calculated MCS level is transmitted via an X2 interface that is typically wired, like the MCS level received from the small cell base station in each frame at step S10. However, the transmission path is not limited to the X2 interface.

The operation of a small cell base station that is performed to achieve interference coordination in a heterogeneous network according to the present invention will be described below.

Figure 3:
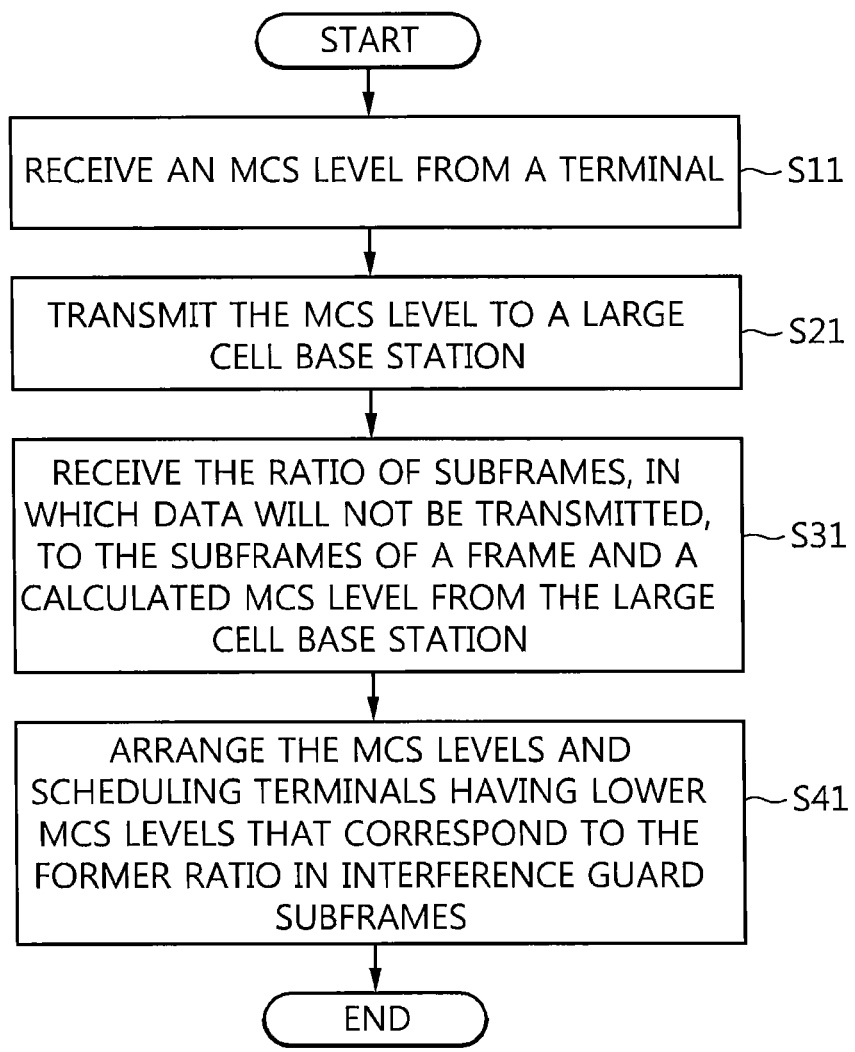
FIG. 3 is a flowchart illustrating the operation of a small cell base station that is performed to achieve interference coordination in a heterogeneous network according to the present invention.

FIG. 3 is a flowchart illustrating the operation of a small cell base station that is performed to achieve interference coordination in a heterogeneous network according to the present invention.

Referring to FIG. 3, the operation of the small cell base station includes step S11 of receiving an MCS level from a terminal, step S21 of transmitting the MCS level to a large cell base station, step S31 of receiving the ratio of subframes, in which data will not be transmitted, to the subframes of a frame and a calculated MCS level from the large cell base station, and step S41 of arranging the MCS levels and scheduling terminals having lower MCS levels that correspond to the former ratio in interference guard subframes.

At step S11 of receiving the MCS level from the terminal, the terminal is a terminal connected according to Equation 2, and each terminal connected to the small cell feeds back an MCS level to the small cell base station in each frame. Each base station transmits information on a 10 ms frame basis pursuant to the LTE standard. In each frame, the terminal u measures the SINR, and feeds back information about a maximum MCS level satisfying a given BLER limitation requirement to a base station to which the terminal u has been connected. The information about the MCS level is used to determine an encoding scheme and error correction code that are used to transmit data from a base station to a terminal. In the LTE communication standard, there are 15 MCS levels, and thus this information is transmitted as 4 bits. The relationship between the MCS level and the reception SINR has been already described in conjunction with Equation 3.

Since step S21 of transmitting the MCS level to the large cell base station corresponds to step S10 of receiving the MCS level from the small cell base station, which is a step of the operation of the large cell base station, the corresponding description given in conjunction with FIG. 2 is used as a detailed description of step 21.

Since step S31 of receiving the ratio of subframes, in which data will not be transmitted, to the subframes of the frame and the calculated MCS level from the large cell base station frame corresponds to step S40 of transmitting the ratio and the calculated MCS level to the small cell base station, which is a step of the operation of the large cell base station, the corresponding description given in conjunction with FIG. 2 is used as a detailed description of step 21.

At step S41 of arranging the MCS levels and scheduling terminals having lower MCS levels that correspond to the former ratio in interference guard subframes, the small cell base station arranges the MCS levels fed back by the terminals, and schedules terminals having lower MCS levels corresponding to the ratio received from the large cell base station in the interference guard subframe. A detailed description thereof will be given in conjunction with FIG. 4.

Referring to FIG. 4, for example, if the ratio is 0.2, only 8 subframes of a macrocell frame 200 become scheduled subframes 201 and the remaining two subframes become empty subframes 202, and thus data is not transmitted during the empty subframes 202. In this case, the picocell base station schedules terminals having lower MCS levels corresponding to a ratio of 0.2 in interference guard subframes 212 free from interference with the macrocell, and schedules the remaining terminals in subframes without interference guard 211. That is, for example, if the arranged MCS levels are 10 in number, terminals that feed back two lower MCS levels are scheduled in the interference guard subframe 212. Although the scheduling is performed on a 1 ms subframe basis, it is not limited thereto. The terminals scheduled in the interference guard subframes have the calculated MCS level that is received from the large cell base station.

An algorithm that determines the ratio of subframes, in which data will not be transmitted, to the subframes of a frame according to the present invention will be described below.

Figure 5:
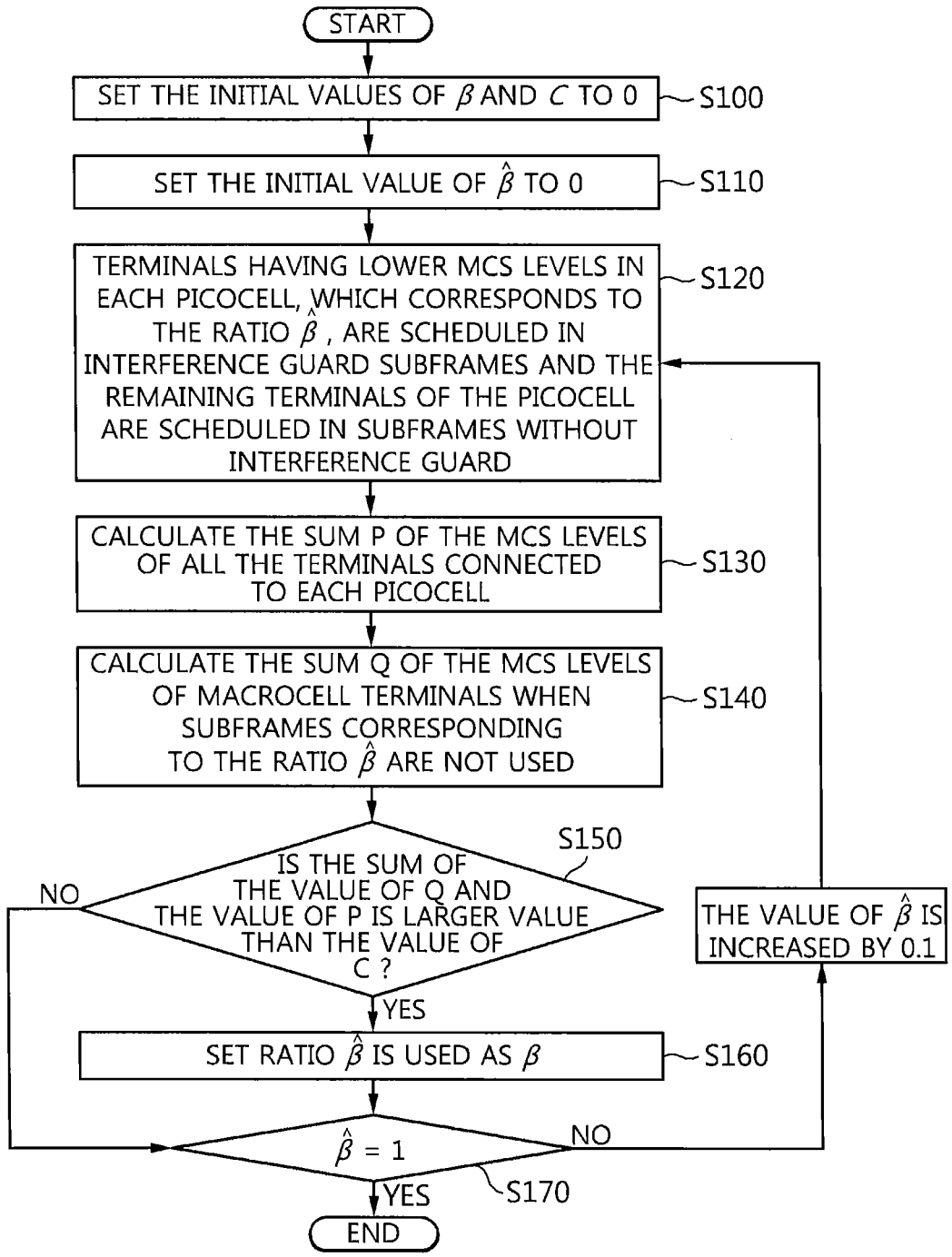
FIG. 5 illustrates an algorithm that determines the ratio of subframes, in which data will not be transmitted, to all the subframes of a frame according to the present invention.

FIG. 5 illustrates the algorithm that determines the ratio of subframes, in which data will not be transmitted, to the subframes of a frame according to the present invention.

Referring to FIG. 5, a macrocell base station generates the ratio that maximizes the sum network throughput based on the MCS level received from a picocell base station and the calculated MCS level obtained by the macrocell base station. In FIG. 5, $\beta$ is the ratio that will be generated, and $\hat{\beta}$ is the temporary ratio that is used to generate the optimum ratio. Furthermore, C is the sum network throughput. P is the sum of the MCS levels of terminals that belong to each picocell, and includes the MCS levels of terminals scheduled in interference guard subframes based on the ratio $\hat{\beta}$ and the MCS levels of terminals scheduled in subframes without interference guard. Q is the sum of the MCS levels of macrocell terminals when subframes corresponding to the ratio $\hat{\beta}$ are not used.

In order to generate the ratio $\hat{\beta}$ as an optimum ratio, that is, the ratio at which the sum network throughput is maximized, the algorithm performs step S100 of setting the initial values of $\beta$ and C to 0 and step S110 of setting the initial value of $\hat{\beta}$ to 0. Thereafter, terminals having lower MCS levels in each picocell, which corresponds to the ratio $\hat{\beta}$, are scheduled in interference guard subframes, and the remaining terminals of the picocell are scheduled in subframes without interference guard at step S120. Thereafter, the sum P of the MCS levels of all the terminals connected to each picocell is calculated at step S130, and the sum Q of the MCS levels of macrocell terminals when subframes corresponding to the ratio $\hat{\beta}$ are not used is calculated at step S140. In order to check whether the set ratio $\hat{\beta}$ maximizes the sum network throughput, it is determined whether the sum of the value of Q and the value of P is larger value than the value of C at step S150. If the value of C is larger than the sum, the set ratio $\hat{\beta}$ is used as $\beta$ that will be generated at step S160. If the value of C is equal to or smaller than the sum, or if the value of $\hat{\beta}$ is not 1 even though the value of C is larger than the sum, the value of $\hat{\beta}$ is increased by 0.1 and fed back to the step of assigning the subframes at step S170. Furthermore, if the value of $\hat{\beta}$ is 1, the corresponding algorithm is terminated at step S170.

The sum network throughput based on RE according to the present invention will be described through computer simulation.

Figure 6:
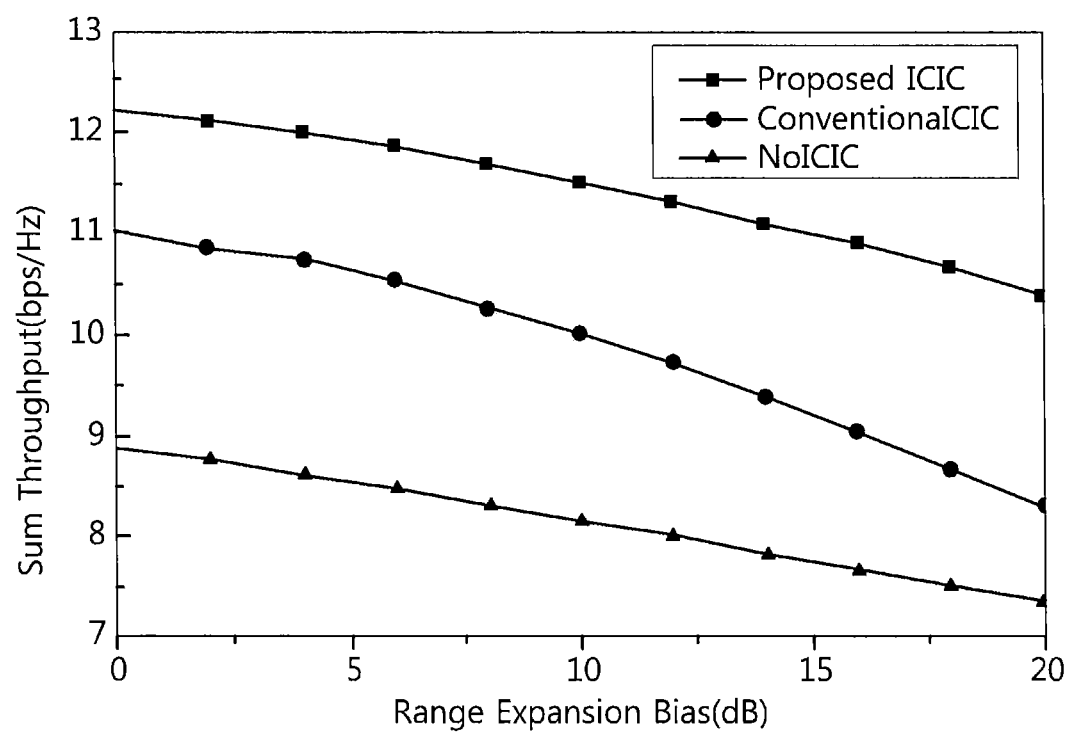
FIG. 6 is a graph illustrating the comparison between the sum network throughput based on RE according to the present invention and that of conventional technology.

FIG. 6 is a graph illustrating the comparison between the sum network throughput based on RE according to the present invention and that of the conventional technology.

FIG. 6 shows the comparisons between the sum network throughput of the present invention and that of the conventional technology through computer simulations. In these computer simulations, the number of picocells j was 2, and the density α of the Poisson point process was 1/833. It was assumed that the RE biases of all picocell base stations were the same. Furthermore, it was assumed that a channel between a base station and a terminal was a Rayleigh fading channel. The conditions for the sizes of cells, the transmission power of base stations, and the large-scale fading gain between a terminal and a base station were set to the 3GPP simulation conditions.

FIG. 6 shows the sum throughputs of various interference coordination methods with respect to RE biases. A conventional ICIC method is a method in which the ratio of subframes in which a macrocell base station does not transmit data is β=0.5, which is constant. A non-ICIC method is a method in which a macrocell base station transmits data in all subframes. From FIG. 6, it can be seen that the proposed ICIC method achieved the throughput gain that was a maximum of 2 bps/Hz higher than that of the conventional ICIC method. Furthermore, it can be also seen that the non-ICIC method achieved the lowest sum throughput.

In accordance with some embodiments of the present invention, there is provided an apparatus and method for performing inter-cell interference coordination using limited channel state information in a heterogeneous network, which are capable of reducing the deterioration of performance attributable to interference even when limited channel state information in a heterogeneous network is given.

In accordance with some embodiments of the present invention, there is provided an apparatus and method for performing inter-cell interference coordination using limited channel state information in a heterogeneous network, which are capable of controlling interference that is exerted on a small cell terminal by a large cell base station using a channel model applied between the terminal and the base station, large-scale fading gain achieved between the terminal and the base station, and feedback information adapted to be periodically transmitted by the terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of performing inter-cell interference coordination, executed on one or more processors, in a heterogeneous network, comprising:
   receiving, by a reception unit loaded on said one or more processors, a modulation and coding scheme (MCS) level from a small cell base station in each frame;
   determining, by a determination unit loaded on said one or more processors, a calculated MCS level based on the MCS level and an interfering signal estimated through probabilistic modeling;
   generating, by a generation unit loaded on said one or more processors, a ratio of subframes, in which data will not be transmitted, to all subframes of a frame based on the MCS level and the calculated MCS level; and
   transmitting, by a transmission unit loaded on said one or more processors, the ratio and the calculated MCS level to the small cell base station.

2. The method of claim 1, wherein the small cell base station is configured such that each terminal connected to the small cell base station feeds back an MCS level to the small cell base station in each frame.

3. The method of claim 2, wherein the MCS level is a maximum MCS level that satisfies a block error rate (BLER) limitation requirement.

4. The method of claim 3, wherein the small cell base station arranges the MCS levels, and schedules terminals that feedback lower MCS levels of the arranged MCS levels, corresponding to the ratio, in interference guard subframes.

5. The method of claim 4, wherein the scheduling is performed on a 1 ms subframe basis.

6. The method of claim 5, wherein the terminals scheduled in the interference guard subframes have the calculated MCS level.

7. The method of claim 1, wherein the interfering signal includes an interfering signal from an adjacent small cell.

8. The method of claim 1, wherein the ratio is generated as an optimum ratio that maximizes sum network throughput.

9. The method of claim 8, wherein the ratio is generated as the optimum ratio based on a sum of an MCS level of each terminal connected to a small cell, the calculated MCS level, and an MCS level of each terminal connected to a large cell when subframes corresponding to the ratio are not used.

10. The method of claim 9, wherein the ratio being generated as the optimum ratio is terminated when the optimum ratio reaches 1 while the ratio is being increased.

11. The method of claim 1, wherein the small cell is configured such that range expansion (RE) has been applied to the small cell.

12. The method of claim 1, wherein the small cell is a picocell or a femtocell.

13. The method of claim 1, wherein receiving and transmitting is performed via an X2 interface.

14. The method of claim 1, wherein each cell in the heterogeneous network transmits information on a 10 ms frame basis in accordance with a Long Term Evolution (LTE) standard.

15. An apparatus for performing inter cell interference coordination in a heterogeneous network, comprising:
   a reception unit loaded on one or more processors configured to receive an MCS level from a small cell base station in each frame;
   a determination unit loaded on said one or more processors and configured to determine a calculated MCS level based on the MCS level and an interfering signal estimated through probabilistic modeling;
   a generation unit loaded on said one or more processors and configured to generate a ratio of subframes, in which data will not be transmitted, to all subframes of a frame based on the MCS level and the calculated MCS level; and
   a transmission unit loaded on said one or more processors and configured to transmit the ratio and the calculated MCS level to the small cell base station.

16. The apparatus of claim 15 wherein:
   the small cell base station is configured such that each terminal connected to the small cell base station feeds back an MCS level to the small cell base station in each frame; and
   the MCS level is a maximum MCS level that satisfies a BLER limitation requirement.

17. The apparatus of claim 16, wherein the small cell base station arranges the MCS levels, and schedules terminals that feed back lower MCS levels of the arranged MCS levels, corresponding to the ratio, in interference guard subframes.

18. The apparatus of claim 15, wherein the interfering signal includes an interfering signal from an adjacent small cell.

19. The apparatus of claim 15, wherein the ratio is generated as an optimum ratio that maximizes sum network throughput.

20. The apparatus of claim 15, wherein the small cell is configured such that RE has been applied to the small cell.

* * * * *